(12) United States Patent
Yang et al.

(10) Patent No.: US 11,938,627 B2
(45) Date of Patent: Mar. 26, 2024

(54) ROBOT JOINT AND ROBOT

(71) Applicant: RETHINK ROBOTICS GMBH, Bochum (DE)

(72) Inventors: Yong Yang, Beijing (CN); Sheng Zhang, Hebei (CN); Chao Jiang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 43 days.

(21) Appl. No.: 17/630,812

(22) PCT Filed: Aug. 1, 2019

(86) PCT No.: PCT/CN2019/098921
§ 371 (c)(1),
(2) Date: Jan. 27, 2022

(87) PCT Pub. No.: WO2021/017002
PCT Pub. Date: Feb. 4, 2021

(65) Prior Publication Data
US 2022/0274249 A1 Sep. 1, 2022

(51) Int. Cl.
*B25J 9/10* (2006.01)
*B25J 9/12* (2006.01)
(Continued)

(52) U.S. Cl.
CPC ............ *B25J 9/108* (2013.01); *B25J 9/1025* (2013.01); *B25J 9/12* (2013.01); *B25J 9/126* (2013.01); *B25J 17/00* (2013.01); *F16H 49/001* (2013.01)

(58) Field of Classification Search
CPC . B25J 9/108; B25J 9/1025; B25J 9/126; B25J 17/00; B25J 9/12; F16H 49/001
See application file for complete search history.

(56) References Cited

U.S. PATENT DOCUMENTS

| 4,592,697 A | 6/1986 | Tuda et al. |
| 2002/0135241 A1* | 9/2002 | Kobayashi ............ H02K 7/083 310/20 |

(Continued)

FOREIGN PATENT DOCUMENTS

| CN | 101264603 A | 9/2008 |
| CN | 102218739 A | 10/2011 |

(Continued)

OTHER PUBLICATIONS

International Search Report dated May 11, 2020, issued in PCT Application No. PCT/CN2019/098921, filed Aug. 1, 2019.

(Continued)

*Primary Examiner* — William C Joyce
(74) *Attorney, Agent, or Firm* — Workman Nydegger

(57) ABSTRACT

A robot joint, including: a housing; an output shaft, at least partially housed inside the housing and provided with a shaft portion and a flange portion at a first end of the shaft portion; a first bearing portion, housed in the housing and supporting a first position of the flange portion of the output shaft; a second bearing portion, housed in the housing and supporting a second position of the output shaft in an axial direction; and a motor, housed in the housing, where the second bearing portion is arranged between the motor and the first bearing portion along the axial direction of the output shaft. Further provided is a robot. By effectively supporting the output shaft at multiple points, the output shaft is enabled to more effectively and stably bear the moment or bending moment of a load, and the robot joint structure is enabled to be compact and lighter.

14 Claims, 1 Drawing Sheet

(51) Int. Cl.
*B25J 17/00* (2006.01)
*F16H 49/00* (2006.01)

(56) References Cited

U.S. PATENT DOCUMENTS

| | | |
|---|---|---|
| 2016/0305527 A1 | 10/2016 | Chuo et al. |
| 2019/0186599 A1 | 6/2019 | Tang et al. |

FOREIGN PATENT DOCUMENTS

| | | | |
|---|---|---|---|
| CN | 103128746 A | | 6/2013 |
| CN | 103527720 A | | 1/2014 |
| CN | 104476561 A | | 4/2015 |
| CN | 204748646 U | | 11/2015 |
| CN | 103629306 B | | 3/2016 |
| CN | 106230186 A | | 12/2016 |
| CN | 107685341 A | | 2/2018 |
| CN | 109366480 A | | 2/2019 |
| CN | 109515766 | * | 3/2019 |
| CN | 106230186 B | | 5/2019 |
| CN | 208841447 U | | 5/2019 |
| JP | 2004-328898 | * | 11/2004 |
| JP | 2006312957 A | | 11/2006 |
| KR | 101549879 B1 | | 9/2015 |
| WO | 2010/115702 A1 | | 10/2010 |
| WO | 2017/213449 A1 | | 12/2017 |
| WO | 2018/040978 A1 | | 3/2018 |

OTHER PUBLICATIONS

European Search Report received for EP Patent Application No. 19940029.2, dated Jul. 4, 2022, 8 pages.
Chinese Search Report dated Jul. 27, 2023, issued in Chinese Application No. 2019800989931.

* cited by examiner

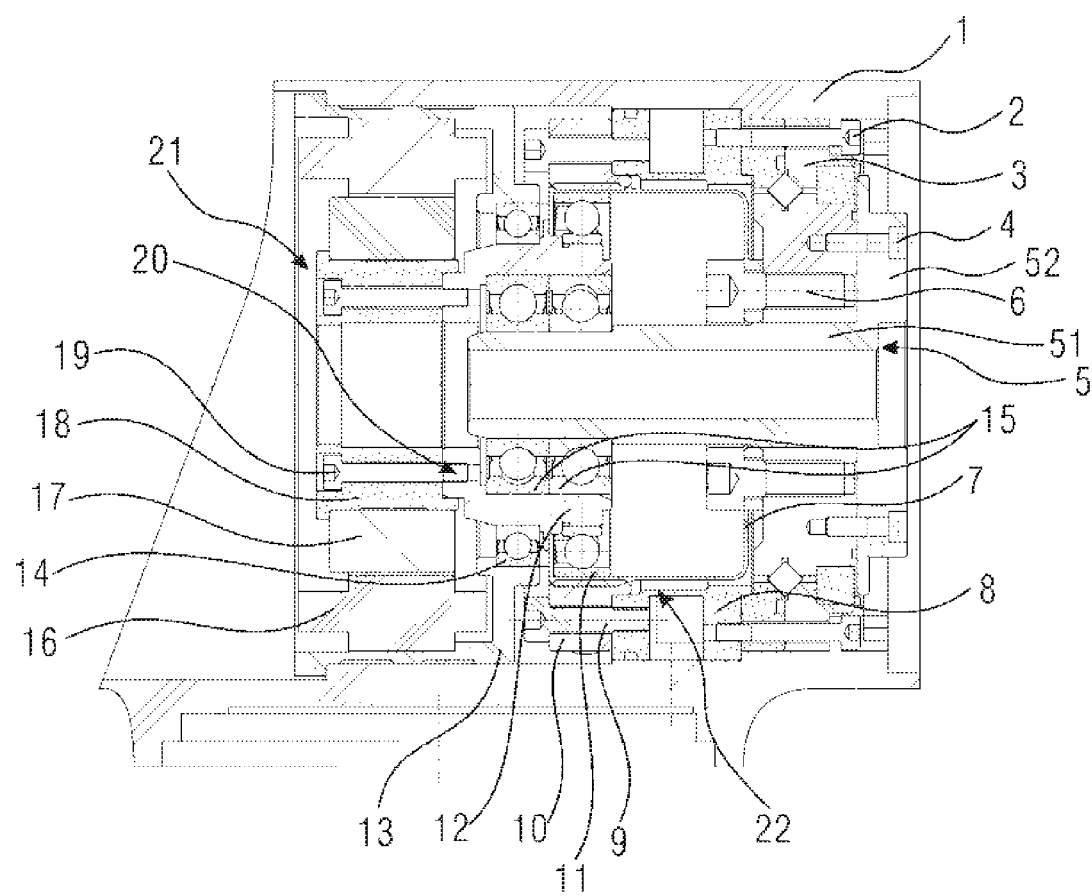

ROBOT JOINT AND ROBOT

TECHNICAL FIELD

The present invention relates to a robot joint and a robot.

BACKGROUND

The use of robots is becoming more and more common, and as the use of robots becomes widespread, robots are used in industries such as industry and services. However, due to the complex structures of conventional robots, the maintenance of the robots becomes complicated, which hinders the wide application of the robots and makes it impossible to quickly apply the robots on a large scale. The standardization and modularization of robots will reduce the manufacturing and use costs of the robots, and improving the accuracy of the robots and simplifying the structures and maintenance of the robots is the trend of robot development. The main focus now is to make the structures of the robots streamlined and lighter, and reduce the manufacturing and use costs thereof. In this regard, a robot joint is an important component among multiple components of a robot. The robot joint can provide power and output the power to a load or an actuator to drive the load or the actuator to move. By building robot joints of different specifications, different robot configurations can be formed, such as robotic arms or biped robots. The existing robot joints have large joint volume and relatively heavy weight, which makes the transportation and assembly of robots cumbersome, and the achievement of standardization difficult; moreover, the cost is high, which hinders the rapid development of robots.

SUMMARY

The objective of the present invention is to provide a robot joint and a robot. The robot joint has a simple and compact structure, and is lighter and has a smaller size than conventional robot joints.

According to an aspect of the present invention, the present invention provides a robot joint, including: a housing; an output shaft, at least partially housed inside the housing and provided with a shaft portion and a flange portion at a first end of the shaft portion; a first bearing portion, housed in the housing and supporting a first position of the flange portion of the output shaft; a second bearing portion, housed in the housing and supporting a second position of the output shaft in an axial direction; and a motor, housed in the housing, where the second bearing portion is arranged between the motor and the first bearing portion along the axial direction of the output shaft. The robot joint according to the present invention adopts a supporting mode similar to a beam inside, the output shaft can thus be effectively supported at multiple points instead of a single point, so that the output shaft is enabled to more effectively and stably bear the moment or bending moment of a load. Moreover, the robot joint has a compact structure, is lighter than conventional robot joints, and especially has a smaller radial size.

According to exemplary embodiments of the robot joint of the present invention, the second bearing portion includes an inboard bearing and an outboard bearing located radially outside of the inboard bearing, where the inboard bearing supports the second position of the output shaft, and the inboard bearing is supported on a support of the motor through the outboard bearing. Supporting the output shaft by the second bearing portion reduces the burden on the first bearing portion for supporting the output shaft, so that the first bearing portion can become lighter and smaller in volume, thereby eliminating the restrictions of the weight and volume of the first bearing portion on the robot joint, and thus the robot joint becomes lighter and smaller.

According to the exemplary embodiments of the robot joint of the present invention, the outboard bearing is supported on the housing through the support. The outboard bearing supports the output shaft at the second position of the output shaft, and establishes a moment transmission path from the output shaft to the housing via the outboard bearing.

According to the exemplary embodiments of the robot joint of the present invention, the inboard bearing includes a plurality of bearings arranged side by side. The plurality of side-by-side bearings of the inboard bearing can more robustly support the second position of the output shaft than a single bearing arrangement, and can withstand and transmit larger moment.

According to the exemplary embodiments of the robot joint of the present invention, the robot joint further includes: a harmonic reducer, where the harmonic reducer includes: a wave generator, where the wave generator is connected to a rotor of the motor through a rotor support, and is supported between the inboard bearing and the outboard bearing. The moment from the output shaft can be transmitted to the wave generator of the harmonic reducer via the inboard bearing, and further transmitted to the outboard bearing by means of the wave generator, and then to the housing through the outboard bearing. Thus, the moment is effectively transmitted through a combination of the harmonic reducer and the second bearing portion.

According to the exemplary embodiments of the robot joint of the present invention, the harmonic reducer further includes: a flexible wheel, a first end being connected to the first bearing portion, and a second end being connected to the wave generator; a flexible bearing radially supported between the wave generator and the flexible wheel, and connected to the wave generator through interference fit; and a plurality of steel wheels radially arranged outside the flexible wheel and engaged with the flexible wheel. The harmonic reducer is connected between the second bearing portion and the first bearing portion, and can transmit the moment from the motor to the output shaft.

According to the exemplary embodiments of the robot joint of the present invention, the robot joint further includes: a moment sensor fixed on the housing, where the steel wheels are fixed on the moment sensor. Thus, the steel wheels are fixed on the housing by means of the moment sensor, and does not rotate, so that the flexible wheel rotates with respect to the steel wheels by means of engagement to transmit power.

According to the exemplary embodiments of the robot joint of the present invention, the inboard bearing is a small deep groove ball bearing, and the outboard bearing is a large deep groove ball bearing. The small deep groove ball bearing and the large deep groove ball bearing can effectively and firmly support the second position of the output shaft, and transmit the bending moment from the output shaft to the housing.

According to the exemplary embodiments of the robot joint of the present invention, the first bearing portion is a crossed roller bearing. Compared with conventional robot joints that only use crossed roller bearings to bear the bending moment of output shafts, in the present invention, due to the use of the second bearing portion, the crossed roller bearing can use a model with a smaller size and a lighter weight, so that the robot joint is lighter in weight and smaller in volume.

According to another aspect of the present invention, the present invention provides a robot, where the robot includes the robot joint according to the above description.

BRIEF DESCRIPTION OF THE DRAWINGS

The accompanying drawings constitute a part of the present description and are utilized to assist in a further understanding of the present invention. The accompanying drawings illustrate the embodiments of the present invention and are used together with the description serve to explain the principles of the present invention. The same components are indicated by the same reference numerals in the accompanying drawings. In the drawings:

FIG. 1 is a schematic structural diagram of a robot joint according to an embodiment of the present invention.

DESCRIPTION OF REFERENCE NUMERALS

1: Housing
2: Hexagon socket screw
3: Crossed roller bearing
4: Hexagon socket screw
5: Output shaft
6: Hexagon socket screw
7: Flexible wheel
8: Moment sensor
9: Hexagon socket screw
10: Flexible wheel
11: Flexible bearing
12: Wave generator
13: Motor stator support
14: Large deep groove ball bearing
15: Small deep groove ball bearing
16: Motor stator
17: Motor rotor
18: Motor rotor support
19: Hexagon socket screw
20: Second bearing portion
21: Motor
22: Harmonic reducer
51: Shaft portion
52: Flange portion.

DETAILED DESCRIPTION

In order to make a person skilled in the art better understand the solutions of the present invention, the following clearly and completely describes the technical solutions in the embodiments of the present invention with reference to the accompanying drawings in the embodiments of the present invention. Apparently, the described embodiments are only some of the embodiments of the present invention rather than all of the embodiments. All other solutions obtained by a person of ordinary skill in the art based on the embodiments of the present invention without involving creative efforts shall fall within the protection scope of the present invention.

It should be noted that, the terms "include", "have" and any other variants in the description and claims as well as the foregoing accompanying drawings of the present invention mean to cover the non-exclusive inclusion, for example, a product or device that includes a list of units is not necessarily limited to those expressly listed units, but may include other units not listed or inherent to such a product or device.

FIG. 1 is a schematic structural diagram of a robot joint according to an embodiment of the present invention. As shown in FIG. 1, a robot joint includes: a housing 1; an output shaft 5, at least partially housed inside the housing 1 and provided with a shaft portion 51 and a flange portion 52 at a first end of the shaft portion 51; a first bearing portion 3, housed in the housing 1 and supporting a first position of the flange portion 52 of the output shaft 5; a second bearing portion 20, housed in the housing 1 and supporting a second position of the output shaft 5 in an axial direction; and a motor 21 housed in the housing 1, where the second bearing portion 20 is arranged between the motor 21 and the first bearing portion 3 along the axial direction of the output shaft 5. The second bearing portion 20 includes: an inboard bearing 15 and an outboard bearing 14 located radially outside of the inboard bearing 15, where the inboard bearing 14 supports the second position of the output shaft 5, and the inboard bearing 15 is supported on a support of the motor 21 through the outboard bearing 14, for example, supported on a stator support 13 of the motor 21. For example, the inboard bearing 15 and the outboard bearing 14 are implemented in this embodiment as a small deep groove ball bearing 15 and a large deep groove ball bearing 14, respectively. The outboard bearing 14 is supported on the housing 1 through the stator support 13. Preferably, the outboard bearing 14 is supported on the housing 1 through the support. The robot joint further includes: a harmonic reducer 22, where the harmonic reducer 22 includes: a wave generator 12, where the wave generator 12 is connected to a rotor 17 of the motor, and is supported between the inboard bearing 15 and the outboard bearing 14. The harmonic reducer 22 further includes: a flexible wheel 7, a first end being connected to the first bearing portion 3, and a second end being connected to the wave generator 12; a flexible bearing 11 radially supported between the wave generator 12 and the flexible wheel 7, and connected to the wave generator 12 through interference fit; and a plurality of steel wheels 10 radially arranged outside the flexible wheel 7 and engaged with the flexible wheel 7. The robot joint further includes: a moment sensor 8 fixed on the housing 1. The steel wheels 10 are fixed on the moment sensor 8.

By adding the second bearing portion 20 as an auxiliary bearing to a shaft system of the robot joint, the bearing capacity of the first bearing portion 3, which is embodied, for example, as a crossed roller bearing, can be increased, thereby decreasing the radial size of the robot joint and reducing the weight of the robot joint. In the embodiments of the present invention, the axial structure of the robot joint is mainly composed of the following components: a housing 1; a hexagon socket screw 2; a crossed roller bearing 3; a hexagon socket screw 4; an output shaft 5; a hexagon socket screw 6; a flexible wheel 7; a moment sensor 8; a hexagon socket screw 9; a steel wheel 10; a flexible bearing 11; a wave generator 12; a motor stator support 13; a large deep groove ball bearing 14; a small deep groove ball bearing 15; a motor stator 16; a motor rotor 17; a motor rotor support 18; and a hexagon socket screw 19.

The connection relationship of the components of the robot joint is as follows: the crossed roller bearing 3 and the moment sensor 8 are fixed on the housing 1 through the hexagon socket screw 2; the output flange 5 is fixed on an inner race of the crossed roller bearing 3 through the hexagon socket screw 4; the flexible wheel 7 is fixed on the inner race of the crossed roller bearing 3 through the hexagon socket screw 6; the steel wheel 10 is fixed on the moment sensor 8 through the hexagon socket screw 9; the flexible wheel 7 is engaged with a gear on the steel wheel 10 for transmission; the flexible bearing 11 is connected to the wave generator 12 through interference fit; the wave generator 12 is connected to an inner race of the large deep groove ball bearing 14 through interference fit; an outer race of the large deep groove ball bearing 14 is in transition fit with the motor stator support 13; the motor stator support 13 is in transition fit with the housing 1; the wave generator 12 is in transition fit with the small deep groove ball bearing 15; the small deep groove ball bearing 15 is in transition fit with the output flange 5; the motor stator support 13 is in interference fit with the motor stator 16; the motor rotor 17 is in interference fit with the motor rotor support 18; the motor rotor support 18 is fixedly connected to the wave generator 12 through the hexagon socket screw 19.

The working principle of an auxiliary support realized by the second bearing portion 20 of the robot joint is as follows: when the bending moment of an external load acts on the flange portion of the output shaft 5, a part of the bending moment is borne by the crossed roller bearing 3, and the other part of the bending moment is transmitted through the flange portion of the output shaft 5, the small deep groove ball bearing 15, the wave generator 12, the large deep groove ball bearing 14, the motor stator support 13, and then back to the housing 1. Due to the effect of the auxiliary support, the bending moment actually acting on the crossed roller bearing 3 is reduced. Therefore, compared with a structure using only the crossed roller bearing, this structure of the robot joint according to the embodiments of the present invention is smaller in volume and lighter in weight.

In the several embodiments provided in the present invention, it should be understood that the disclosed technical content can be implemented in other manners. The apparatus embodiments described above are merely exemplary. For example, the division of the units or modules is merely the division of logic functions, and may use other division manners during actual implementation. For example, a plurality of units or modules or components may be combined, or may be integrated into another system, or some features may be omitted or not performed. In addition, the coupling or direct coupling between the displayed or discussed components may be the indirect coupling through some interfaces, modules, or units, and may be electrical or of other forms.

The above are only preferred embodiments of the present invention, and are not intended to limit the present invention. Various modifications and variations of the present invention are possible for a person skilled in the art. Any modification, equivalent replacement, or improvement made without departing from the spirit and principle of the present invention shall fall within the protection scope of the present invention.

The invention claimed is:

1. A robot joint, comprising:
   a housing;
   an output shaft at least partially housed inside the housing and provided with a shaft portion having a first end and an opposing second end and a flange portion at the first end of the shaft portion;
   a first bearing portion housed in the housing and supporting the flange portion of the output shaft at the first end of the shaft portion;
   a second bearing portion housed in the housing at the second end of the shaft portion and supporting the output shaft, the second bearing portion being spaced apart from the first bearing portion along an axial direction of the output shaft; and
   a motor housed in the housing, wherein the second bearing portion is arranged between the motor and the first bearing portion along the axial direction of the output shaft and wherein the second bearing portion comprises:
      an inboard bearing and an outboard bearing located radially outside of the inboard bearing, wherein the inboard bearing supports the output shaft, and the inboard bearing is supported on a support of the motor through the outboard bearing.

2. The robot joint according to claim 1, wherein the outboard bearing is supported on the housing through the support.

3. The robot joint according to claim 1, wherein the inboard bearing comprises a plurality of bearings arranged side by side.

4. The robot joint according to claim 1, further comprising:
   a harmonic reducer, wherein the harmonic reducer comprises:
      a wave generator, wherein the wave generator is connected to a rotor of the motor through a rotor support, and is supported between the inboard bearing and the outboard bearing.

5. The robot joint according to claim 4, wherein the harmonic reducer further comprises:
   a flexible wheel with a first end connected to the first bearing portion, and a second end connected to the wave generator;
   a flexible bearing radially supported between the wave generator and the flexible wheel, and connected to the wave generator through interference fit; and
   a plurality of steel wheels radially arranged outside the flexible wheel and engaged with the flexible wheel.

6. The robot joint according to claim 5, further comprising:
   a moment sensor fixed on the housing, wherein the steel wheels are fixed on the moment sensor.

7. The robot joint according to claim 1, wherein the inboard bearing is a small deep groove ball bearing, and the outboard bearing is a large deep groove ball bearing.

8. The robot joint according to claim 1, wherein the first bearing portion is a crossed roller bearing.

9. A robot, comprising the robot joint according to claim 1.

10. The robot joint according to claim 1, wherein the outboard bearing being is located radially outside of the inboard bearing so that the outboard bearing encircles at least a portion of the inboard bearing.

11. The robot joint according to claim 10, wherein a wave generator is disposed between the inboard bearing and the outboard bearing so that the outboard bearing encircles at least a portion of the wave generator.

12. A robot joint, comprising:
   a housing;
   an output shaft at least partially housed inside the housing and provided with a shaft portion and a flange portion at a first end of the shaft portion;
   a first bearing portion housed in the housing and supporting the flange portion of the output shaft;
   a second bearing portion housed in the housing and supporting the output shaft, the second bearing portion being spaced apart from the first bearing portion along an axial direction of the output shaft, the second bearing portion comprising an inboard bearing having an inner ring and an outer ring, the inner ring being disposed on the output shaft, the outer ring being located radially outside of the inner ring so as to be spaced apart from the output shaft, the outer ring being disposed on a wave generator; and a motor housed in the housing, wherein the second bearing portion is arranged between the motor and the first bearing portion along the axial direction of the output shaft.

13. A robot joint, comprising:

a housing;

an output shaft at least partially housed inside the housing and provided with a shaft portion and a flange portion at a first end of the shaft portion;

a first bearing portion housed in the housing and supporting the flange portion of the output shaft;

a second bearing portion housed in the housing and supporting the output shaft, the second bearing portion being spaced apart from the first bearing portion along an axial direction, the second bearing portion comprising an inboard bearing and an outboard bearing, the outboard bearing being located radially outside of the inboard bearing so that the outboard bearing encircles at least a portion of the inboard bearing, the inboard bearing supporting the output shaft; and a motor housed in the housing, wherein the second bearing portion is arranged between the motor and the first bearing portion along the axial direction of the output shaft.

14. The robot joint according to claim 13, wherein a wave generator is disposed between the inboard bearing and the outboard bearing so that the outboard bearing encircles at least a portion of the wave generator.

* * * * *